(12) United States Patent
Yakushi

(10) Patent No.: US 11,667,317 B2
(45) Date of Patent: Jun. 6, 2023

(54) STEERING DEVICE AND INDUSTRIAL VEHICLE

(71) Applicant: KABUSHIKI KAISHA TOYOTA JIDOSHOKKI, Kariya (JP)

(72) Inventor: Tadayuki Yakushi, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 0 days.

(21) Appl. No.: 17/856,397

(22) Filed: Jul. 1, 2022

(65) Prior Publication Data

US 2023/0010544 A1    Jan. 12, 2023

(30) Foreign Application Priority Data

Jul. 7, 2021 (JP) .............................. JP2021-112915

(51) Int. Cl.
*B62D 1/04* (2006.01)
*B62D 1/14* (2006.01)
*B66F 9/075* (2006.01)

(52) U.S. Cl.
CPC .............. *B62D 1/043* (2013.01); *B62D 1/14* (2013.01); *B66F 9/0759* (2013.01); *B66F 9/07568* (2013.01)

(58) Field of Classification Search
CPC .. B62D 1/04; B62D 1/043; B62D 1/08; B66F 9/0759; B66F 9/07568; G05G 1/08; G05G 1/10
See application file for complete search history.

(56) References Cited

U.S. PATENT DOCUMENTS

| | | | | |
|---|---|---|---|---|
| 1,091,932 A | * | 3/1914 | Hill .......................... | B62D 1/04 74/552 |
| 1,572,995 A | * | 2/1926 | Gates ........................ | F16B 2/08 403/233 |
| 1,679,164 A | * | 7/1928 | McBride .................. | B62D 1/04 D12/176 |
| 2,139,546 A | * | 12/1938 | Hansen .................. | B62D 1/043 74/557 |

(Continued)

FOREIGN PATENT DOCUMENTS

DE  19956870 A1  6/2001
EP  0302193 A1 *  2/1989

(Continued)

OTHER PUBLICATIONS

Machine translation of EP 0302193 A1 obtained on Nov. 22, 2022.*

*Primary Examiner* — Adam D Rogers
(74) *Attorney, Agent, or Firm* — Sughrue Mion, PLLC

(57) ABSTRACT

A steering device includes a rotation central portion having a rotation axis Ax of the steering device and a steering unit connected to the rotation central portion. The direction in which the rotation axis of the rotation central portion extends is an axial direction. One of directions perpendicular to the axial direction is a radial direction. A direction perpendicular to the axial direction and the radial direction is a width direction. The steering unit protrudes from the rotation central portion in the radial direction in plan view of the steering device in the axial direction. A maximum width of the steering unit in the width direction is less than or equal to a maximum width of the rotation central portion in the width direction.

9 Claims, 6 Drawing Sheets

(56) References Cited

U.S. PATENT DOCUMENTS

| | | | | |
|---|---|---|---|---|
| 6,182,778 | B1 * | 2/2001 | Henshaw | B66F 9/07545 |
| | | | | 187/222 |
| 7,204,338 | B2 * | 4/2007 | Katae | B62D 1/043 |
| | | | | 180/315 |
| D666,950 | S * | 9/2012 | Haubrich | D12/176 |
| 9,168,943 | B2 * | 10/2015 | Greppi | B62D 1/06 |
| 9,382,105 | B2 * | 7/2016 | Hoock | B62D 1/18 |

FOREIGN PATENT DOCUMENTS

| | | | |
|---|---|---|---|
| JP | 2003-073085 A | | 3/2003 |
| KR | 20010048510 A | * | 6/2001 |
| KR | 20160089579 A | * | 7/2016 |

* cited by examiner

STEERING DEVICE AND INDUSTRIAL VEHICLE

BACKGROUND

1. Field

The present disclosure relates to a steering device and an industrial vehicle.

2. Description of Related Art

Japanese Laid-Open Patent Publication No. 2003-073085 discloses a steering device used to steer a vehicle. The steering device includes an annular rib. The steering device further includes a rotation central portion having the rotation axis of the steering device and a steering unit connected to the rotation central portion. The rib has an annular shape that includes the rotation central portion in plan view of the steering device in the extending direction of the rotation axis of the rotation central portion.

To allow a vehicle operator to drive comfortably, the space around the driver's seat needs to be wide. Examples of widening the space around the driver's seat include reducing the size of the steering device. However, the reduction of the steering device in size necessitates a decrease in the diameter of the annular rib. In the above-described steering device including the annular rib, the diameter of the rib needs to be greater than that of the rotation central portion. Thus, reducing the size of the steering device is difficult.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A steering device according to an aspect of the present disclosure is used to steer a vehicle. The steering device includes a rotation central portion that includes a rotation axis of the steering device and a steering unit that is connected to the rotation central portion. A direction in which the rotation axis of the rotation central portion extends is referred to as an axial direction, one of directions that are perpendicular to the axial direction is referred to as a radial direction, and a direction that is perpendicular to the axial direction and the radial direction is referred to as a width direction. The steering unit protrudes from the rotation central portion in the radial direction in plan view of the steering device in the axial direction. A maximum width of the steering unit in the width direction is less than or equal to a maximum width of the rotation central portion in the width direction.

In this structure, as compared with when the steering unit includes an annular rib, the width of the entire steering device is reduced. Accordingly, the steering device of the present disclosure has a smaller size than the steering device including the annular rib.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

A steering device 40 and an industrial vehicle 100 according to an embodiment will now be described. The steering device 40 of the present embodiment is mounted on the industrial vehicle 100. The "front," "rear," "left," and "right" in the following description refer to the front, rear, left, and right of the industrial vehicle 100, respectively.

Industrial Vehicle

Figure 1:
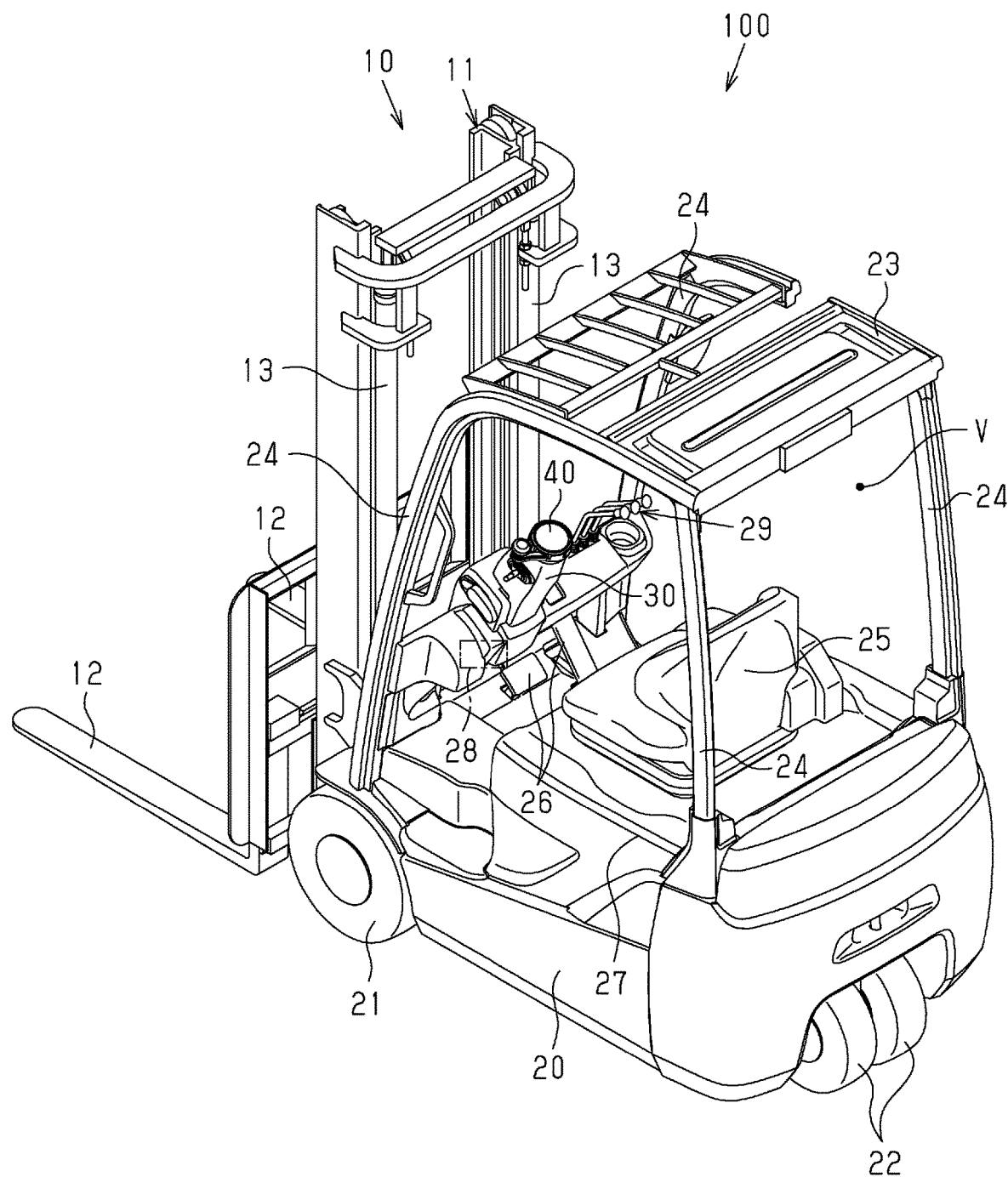
FIG. 1 is a perspective view showing the entire industrial vehicle according to an embodiment.

As shown in FIG. 1, the industrial vehicle 100 (vehicle) is a counterbalance forklift. The industrial vehicle 100 uses electric power as a power source. The industrial vehicle 100 includes a cargo handling device 10, a vehicle body 20, two driven wheels 21, two steered wheels 22, an overhead guard 23, four pillars 24, a driver's seat 25, foot pedals 26, a battery hood 27, a control circuit 28, a cargo handling operation unit 29, a steering column 30, and the steering device 40.

The cargo handling device 10 includes a mast 11 extending in the up-down direction, forks 12 that can be lifted and lowered together with the mast 11, and a lift cylinder 13 that lifts and lowers the forks 12. The forks 12 are loaded with cargo. The lift cylinder 13 is a hydraulic cylinder. As the lift cylinder 13 extends and contracts so as to lift and lower the mast 11, the forks 12 are lifted and lowered.

The vehicle body 20 is located behind the mast 11.

The two driven wheels 21 are located at the lower front part of the vehicle body 20. The two driven wheels 21 are spaced apart from each other in the left-right direction.

The two steered wheels 22 are located at the lower rear part of the vehicle body 20. The two steered wheels 22 are adjacent to each other.

The overhead guard 23 is located above the vehicle body 20.

The four pillars 24 connect the vehicle body 20 to the overhead guard 23. The pillars 24 extend from the corners of the vehicle body 20 toward the overhead guard 23, respectively.

The driver's seat 25 is mounted on the vehicle body 20. More specifically, the driver's seat 25 is located between the vehicle body 20 and the overhead guard 23. An operator of the industrial vehicle 100 sits on the driver's seat 25. Thus, the driver's seat 25 is located in a driver's cabin V. In the present embodiment, the driver's cabin V is a space surrounded by the vehicle body 20, the overhead guard 23, and the four pillars 24. To facilitate understanding, the operator of the industrial vehicle 100 is hereinafter simply referred to as the operator.

The foot pedals 26 are located in front of the driver's seat 25. Thus, the foot pedals 26 are located in the lower front part of the driver's cabin V. The foot pedals 26 includes an accelerator pedal and a brake pedal. When the foot pedals 26 are operated, the industrial vehicle 100 travels.

The battery hood 27 is a wall that defines a battery accommodation portion and the driver's cabin V and can be opened and closed. The battery accommodation portion accommodates a battery which is a power source of the industrial vehicle 100. The battery is, for example, a rechargeable battery. Examples of the rechargeable battery include a lithium-ion rechargeable battery and a lead-acid battery. The battery hood 27 is located below the driver's seat 25. The operator opens the battery hood 27 by, for example, bringing down the driver's seat 25 rearward. The operator takes the battery out of the battery accommodation portion by opening the battery hood 27.

The control circuit 28 includes a processor and a memory. Examples of the processor include a central processing unit (CPU), a graphics processing unit (GPU), and a digital signal processor (DSP). The memory includes a random access memory (RAM) and a read-only memory (ROM). The memory stores program codes or instructions configured to cause the processor to execute processes. The memory, or computer readable medium, includes any type of medium that is accessible by general-purpose computers or dedicated computers. The control circuit 28 may include a hardware circuit such as an application-specific integrated circuit (ASIC) or a field-programmable gate array (FPGA). The control circuit 28, which is a processing circuit, may include one or more processors that run according to a computer program, one or more hardware circuits (e.g., ASIC or FPGA), or a combination thereof.

The control circuit 28 obtains information related to traveling operation and information related to cargo handling operation. Examples of the information related to traveling operation include the travel speed of the industrial vehicle 100, the directions of the steered wheels 22, and the remaining battery life. Examples of the information related to cargo handling operation include a cargo weight, the heights of the forks 12, and a tilt angle.

The cargo handling operation unit 29 is used to operate the cargo handling device 10. In the present embodiment, the cargo handling operation unit 29 includes multiple (more specifically, three) levers. The cargo handling operation unit 29 may be of a button type or a handle type. The cargo handling operation unit 29 is located at the front right part of the driver's cabin V. In the present embodiment, the industrial vehicle 100 travels and performs cargo handling when operated by the operator.

The steering column 30 extends from the front part of the driver's cabin V toward the driver's seat 25. In other words, the steering column 30 is located at a position forward of the driver's seat 25 (more specifically, at a position in front of the driver's seat 25). The cargo handling operation unit 29 is located on the right side of the steering column 30. The steering column 30 includes an angle sensor (not shown). The angle sensor detects the rotation angle of the steering device 40. The orientation of each steered wheel 22 is changed based on the detection result of the angle sensor.

The steering device 40 has a ringless shape without an annular rib. The steering device 40 is connected to the steering column 30. The steering device 40 is used to steer the industrial vehicle 100.

Steering Device

The steering device 40 will now be described in detail.

Figure 2:
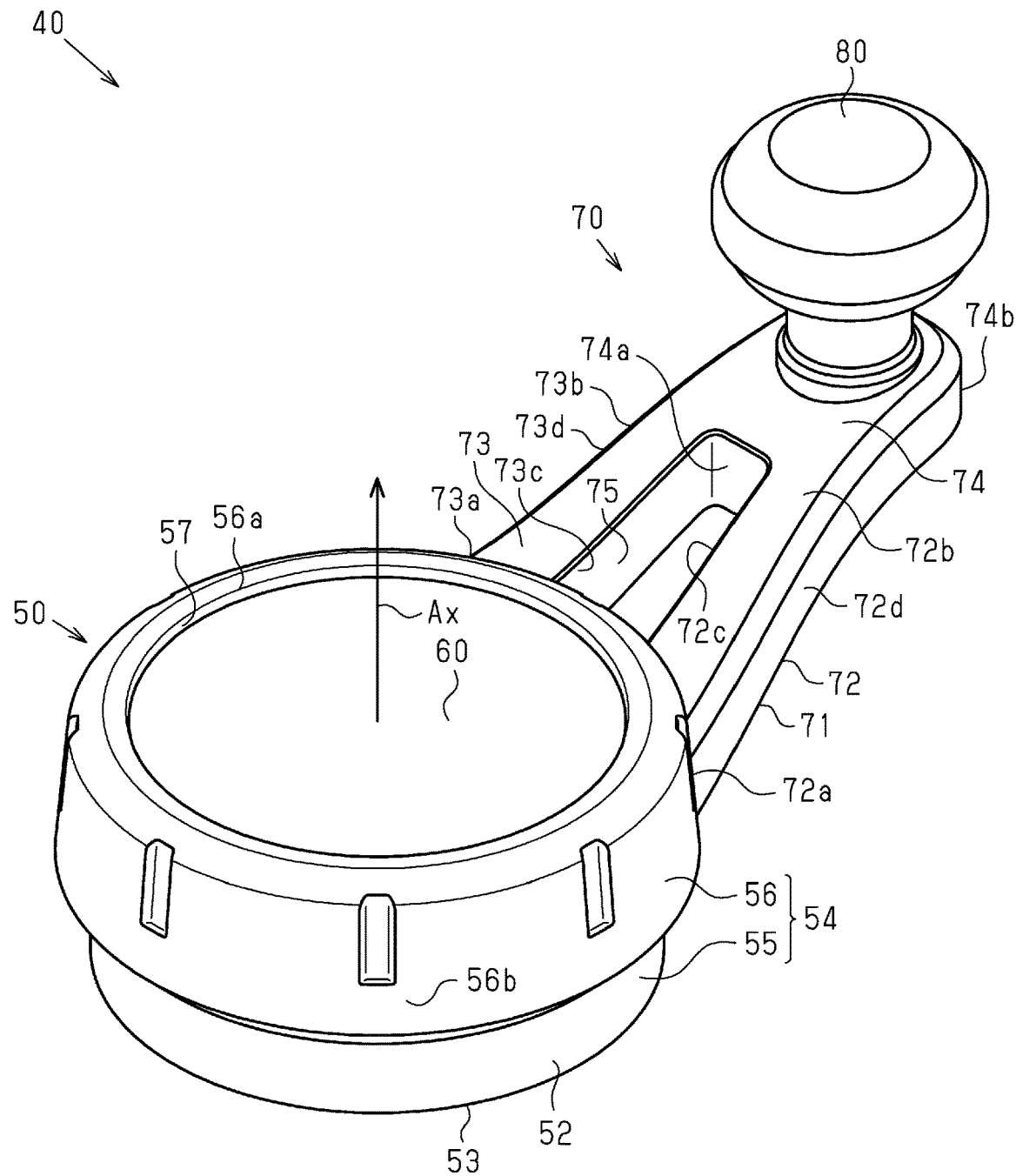
FIG. 2 is a perspective view showing the entire steering device according to the embodiment.

Referring to FIG. 2, the operator rotates the steering device 40 with respect to a rotation axis Ax of the steering device 40 so as to change the orientation of each steered wheel 22. This allows the operator to adjust the travel direction of the industrial vehicle 100. To facilitate understanding, the rotation axis Ax of the steering device 40 is hereinafter simply referred to as the rotation axis Ax. The extending direction of the rotation axis Ax is referred to as the axial direction z. Further, "in plan view of the steering device 40 in the axial direction z" may be simply referred to as "in plan view in the axial direction z." The steering device 40 includes a rotation central portion 50 and a steering unit 70.

Figure 3:
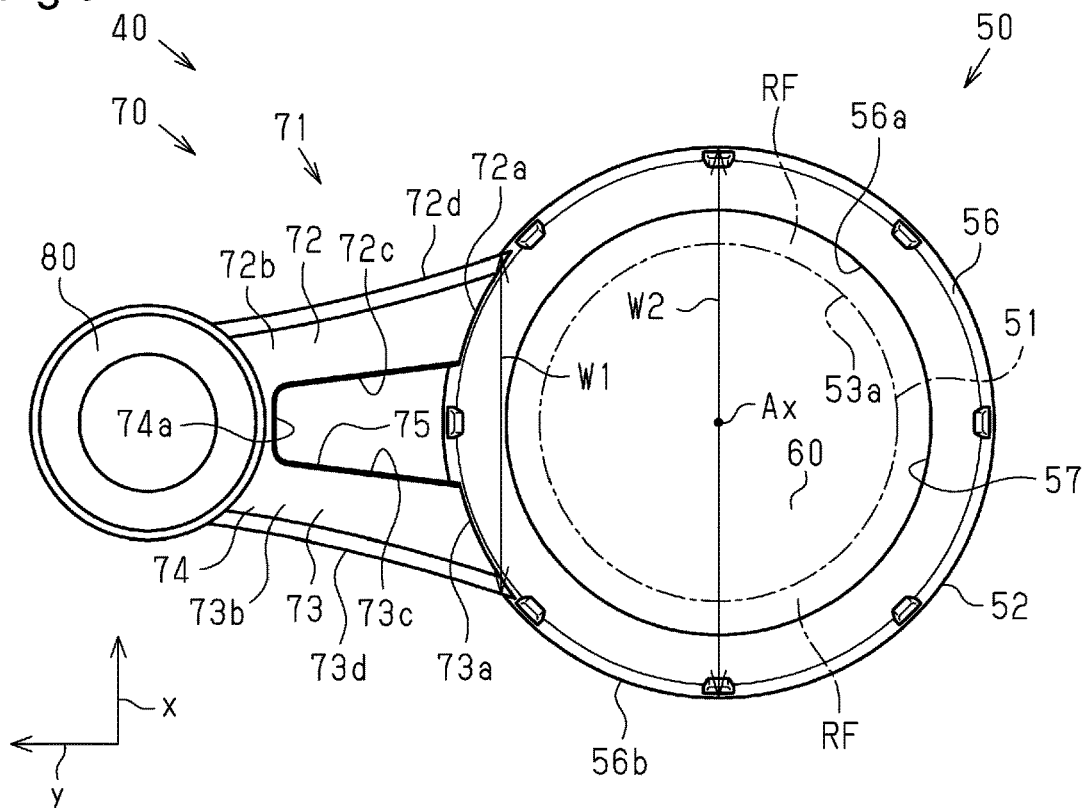
FIG. 3 is a plan view showing the steering device of FIG. 2 in the axial direction.

As shown in FIG. 3, the rotation central portion 50 is circular in plan view in the axial direction z. The rotation central portion 50 includes a fixed portion 51, a rotation portion 52, and a display 60.

Figure 4:
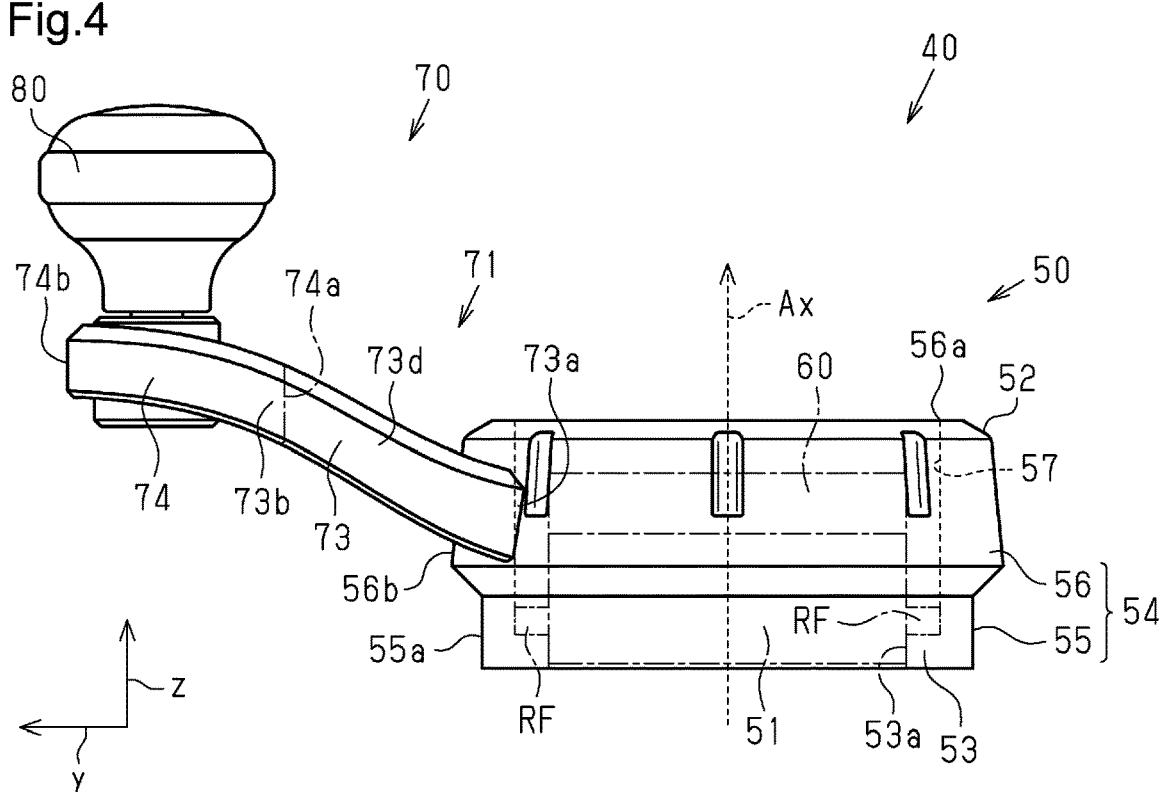
FIG. 4 is a plan view showing the steering device of FIG. 2 in the width direction.

As shown in FIGS. 3 and 4, the fixed portion 51 is columnar. The fixed portion 51 extends in the axial direction z. The fixed portion 51 is capable of being fixed to the steering column 30. The center axis of the fixed portion 51 coincides with the rotation axis Ax.

The rotation portion 52 is rotatable relative to the fixed portion 51 with respect to the rotation axis Ax. The rotation axis of the rotation portion 52 coincides with the rotation axis Ax. The rotation portion 52 includes an end wall 53 and a circumferential wall 54.

The end wall 53 has a disk shape in which its thickness direction coincides with the axial direction z. The center of the end wall 53 overlaps the rotation axis Ax in plan view in the axial direction z. The end wall 53 includes an insertion hole 53a through which the fixed portion 51 is inserted. The end wall 53 is a connection end that is connected to the industrial vehicle 100. The fixed portion 51 is connected to the steering column 30 through the insertion hole 53a of the end wall 53 so as to connect the steering device 40 to the industrial vehicle 100.

The circumferential wall 54 extends in the axial direction z from the outer circumference of the end wall 53. The circumferential wall 54 includes a connection circumferential wall 55 and a protruding circumferential wall 56.

The connection circumferential wall 55 is connected to the end wall 53. The connection circumferential wall 55 extends in the axial direction z from the outer circumference of the end wall 53. The connection circumferential wall 55 is tubular.

The protruding circumferential wall 56 is tubular. The protruding circumferential wall 56 extends from an end of the connection circumferential wall 55 in the axial direction z. In the axial direction z, this end is located opposite an end of the connection circumferential wall 55 to which the end wall 53 is connected. The protruding circumferential wall 56 is connected to the end wall 53 by the connection circumferential wall 55. The protruding circumferential wall 56 includes an end 56a located opposite the connection circumferential wall 55 in the axial direction z. This end is hereinafter referred to as the opening end 56a. The opening end 56a is circular in plan view in the axial direction z.

An outer circumferential surface 56b of the protruding circumferential wall 56 is farther from the rotation axis Ax than an outer circumferential surface 55a of the connection circumferential wall 55. The outer circumferential surface 56b of the protruding circumferential wall 56 is inclined to become closer to the rotation axis Ax as the outer circumferential surface 56b becomes farther from the end wall 53 in the axial direction z.

The end wall 53 and the inner circumferential wall of the circumferential wall 54 define an accommodation recess 57. The accommodation recess 57 accommodates at least part of the fixed portion 51.

A rotation mechanism RF is disposed between the fixed portion 51 and the rotation portion 52. The rotation mechanism RF allows the rotation portion 52 to rotate relative to the fixed portion 51. The rotation mechanism RF is, for example, a planetary gear mechanism. Instead, the rotation mechanism RF may be a bearing mechanism or may be a sliding mechanism using lubricating oil.

The display 60 is a display device that can be seen from the driver's seat 25. The display 60 displays a display content such as the information related to the traveling state or cargo handling state of the industrial vehicle 100. The display 60 displays the display content based on, for example, an instruction from the control circuit 28.

The display 60 is accommodated in the accommodation recess 57. In the present embodiment, the display 60 is fixed to the fixed portion 51. The display 60 is circular in plan view in the axial direction z. More specifically, the display 60 has a disk shape perpendicular to the rotation axis Ax. The center of the display 60 coincides with the center of the rotation central portion 50 in plan view in the axial direction z. In other words, the center of the display 60 overlaps the rotation axis Ax in plan view in the axial direction z.

The steering unit 70 pivots about the rotation axis Ax of the rotation central portion 50. The steering unit 70 is connected to the rotation central portion 50. The steering unit 70 is fixed to the rotation portion 52. This allows the operator to rotate the rotation portion 52 by operating the steering unit 70. In plan view in the axial direction z, the steering unit 70 protrudes from the rotation central portion 50 in a radial direction y. The radial direction y is one of the directions that are perpendicular to the axial direction z. The direction that is perpendicular to the axial direction z and the radial direction y is hereinafter referred to as the width direction x.

When the protruding direction of the steering unit 70, namely, the radial direction y is parallel to the left-right direction of the industrial vehicle 100, the steering unit 70 is located at a neutral position. When the steering unit 70 is located at the neutral position, the rotation angle of the steering device 40 is 0°.

The steering unit 70 includes an arm 71 and a grip 80.

In plan view in the axial direction z, the arm 71 extends from the rotation central portion 50 (more specifically, protruding circumferential wall 56) in the radial direction y. In plan view in the axial direction z, the arm 71 is U-shaped. In plan view in the axial direction z, the arm 71 opens toward the rotation central portion 50. The arm 71 opens in the radial direction y toward the rotation axis Ax. The arm 71 includes two connection side portions 72, 73 (first connection side portion 72 and second connection side portion 73) and a merge side portion 74.

The connection side portions 72, 73 extend in a curved manner. The cross-section of each of the connection side portions 72, 73 is a cross-section of a local surface in which the extending curve of the connection side 72, 73 is a normal. The connection side portion 72 includes a first end 72a, a second end 72b, a connection inner surface 72c, and a connection outer surface 72d. The connection side portion 73 includes a first end 73a, a second end 73b, a connection inner surface 73c, and a connection outer surface 73d.

The first ends 72a, 73a are connected to the rotation portion 52. More specifically, the first ends 72a, 73a are connected to the protruding circumferential wall 56. In plan view in the axial direction z, the first ends 72a, 73a are spaced apart from each other in the width direction x.

In plan view in the axial direction z, the connection side portions 72, 73 extend in the radial direction y from the rotation portion 52. More specifically, in plan view in the axial direction z, the connection side portions 72, 73 extend in the radial direction y from the protruding circumferential wall 56, to which the first ends 72a, 73a are fixed.

The connection inner surface 72c is one of the surfaces of the connection side portion 72. The connection inner surface 73c is one of the surfaces of the connection side portion 73. The connection inner surface 72c and the connection inner surface 73c face each other in the width direction x. Thus, the connection side portions 72, 73 are spaced apart from each other in the width direction x. The connection inner surfaces 72c, 73c are connected to the outer circumferential surface 56b of the protruding circumferential wall 56.

In plan view of the steering device 40 in the width direction x, the connection side portions 72, 73 overlap each other. As the connection side portions 72, 73 become farther from the rotation axis Ax in the radial direction y, the connection side portions 72, 73 extend so as to become farther from the end wall 53 of the rotation portion 52. Thus, the distance between the arm 71 and the end wall 53 in the axial direction z increases as the distance from the rotation central portion 50 in the radial direction y increases. The first connection side portion 72 includes an inflection point between the first end 72a and the second end 72b. The first connection side portion 73 includes an inflection point between the first end 73a and the second end 73b. At each inflection point, the curvature in the axial direction z is 0.

The connection outer surface 72d is located opposite the connection inner surface 72c in the width direction x. The connection outer surface 73d is located opposite the connection inner surface 73c in the width direction x. In plan view in the axial direction z, the connection outer surfaces 72d, 73d define the outer edge of the arm 71. The distance between the connection outer surface 72d and the connection outer surface 73d in the width direction x decreases as the distance from the rotation central portion 50 (more specifically, rotation axis Ax) in the radial direction y increases. Thus, the width of the arm 71 decreases as the arm 71 becomes farther from the rotation central portion 50 in the radial direction y. The width of a member refers to the length of the member in the width direction x. When the width of a member differs depending on the position, the maximum width of the entire member is referred to as the maximum width.

The merge side portion 74 is a member to which the second ends 72b, 73b are connected. The merge side portion 74 is an end of the arm 71 extending in the radial direction y. The merge side portion 74 is a tip of the arm 71 located opposite the rotation central portion 50. The merge side portion 74 is an end of the arm 71 separated from the rotation central portion 50 in the radial direction y. The merge side portion 74 includes a merge inner surface 74a and a merge outer surface 74b.

The merge inner surface 74a is one of the surfaces of the merge side portion 74. The merge inner surface 74a connects the connection inner surface 72c to the connection inner surface 73c. The merge inner surface 74a faces the outer circumferential surface 56b of the protruding circumferential wall 56. In plan view in the axial direction z, the connection inner surfaces 72c, 73c and the merge inner surface 74a define a notch. The notch and the outer circumferential surface 56b of the protruding circumferential wall 56 define a through portion 75. The through portion 75 extends through the steering unit 70 (more specifically, arm 71) in the axial direction z. Thus, the steering unit 70 includes the through portion 75. Further, the arm 71 includes the through portion 75.

The merge outer surface 74b is located opposite the merge inner surface 74a at least in the radial direction y. The merge outer surface 74b connects the connection outer surface 72d to the connection outer surface 73d. In plan view in the axial direction z, the merge outer surface 74b is the outer edge of the arm 71. In the present embodiment, the connection outer surface 72d, 73d and the merge outer surface 74b define the outer edge of the arm 71 in plan view in the axial direction z.

The width of the merge side portion 74 is less than or equal to a maximum width W2 of the rotation central portion 50. The maximum width of the merge side portion 74 is equal to the distance between the second ends 72b, 73b in the width direction x. Thus, a maximum width W1 of the arm 71 is equal to the distance between the connection outer surfaces 72d, 73d in the width direction x. The maximum width W1 of the arm 71 is less than the maximum width W2 of the rotation central portion 50. The width of the arm 71 decreases from the rotation central portion 50 toward the merge side portion 74. The maximum width W1 of the arm 71 may be equal to the maximum width W2 of the rotation central portion 50. That is, the maximum width W1 of the arm 71 only needs to be less than or equal to the maximum width W2 of the rotation central portion 50. In the present embodiment, the maximum width W2 of the rotation central portion 50 is equal to the diameter of the outer circle of the protruding circumferential wall 56 of the rotation central portion 50.

The grip 80 is held by the operator to operate the steering device 40. In plan view in the axial direction z, the grip 80 is circular. The maximum width of the grip 80 is less than or equal to the maximum width W2 of the rotation central portion 50. The width of the grip 80 is less than the maximum width W1 of the arm 71. The grip 80 of the present embodiment is a knob that generally has the shape of an oval sphere. The maximum width of the grip 80 is equal to the diameter of the grip 80 in plan view in the axial direction z.

The grip 80 is connected to the arm 71. More specifically, the grip 80 is connected to the merge side portion 74. Thus, the width of the arm 71 decreases from the rotation central portion 50 toward the grip 80.

The grip 80 extends from the arm 71 so as to become farther from the end wall 53. More specifically, the grip 80 extends in the axial direction z from the merge side portion 74. The grip 80 extends at least in the axial direction z so as to become farther from the end wall 53. The grip 80 is rotatable about its rotation axis relative to the arm 71. The rotation axis of the grip 80 is parallel to the axial direction z. More specifically, the grip 80 is connected to the arm 71 by a rotation mechanism. The rotation mechanism may be, for example, a planetary gear mechanism, a bearing mechanism, or a sliding mechanism. In plan view in the axial direction z, the grip 80 protrudes from the merge side portion 74 in the radial direction y. The diameter of the grip 80 is less than the maximum width W1 of the arm 71. Thus, the maximum width of the steering unit 70 is the maximum width W1 of the arm 71. To facilitate understanding, the maximum width of the steering unit 70 in the present embodiment may be referred to as the maximum width W1.

The larger one of the maximum width W1 of the steering unit 70 and the maximum width W2 of the rotation central portion 50 is a maximum width W3 of the entire steering device 40. Since the maximum width W1 of the steering unit 70 is less than the maximum width W2 of the rotation central portion 50, the maximum width W3 of the entire steering device 40 is the maximum width W2 of the rotation central portion 50.

Relationship between Steering Device 40 and Industrial Vehicle 100

The surroundings of the steering device 40 in the driver's cabin V will now be described. The distance from the rotation axis Ax to the grip 80 is referred to as the protruding length R. The protruding length R is an indicator that indicates the degree to which the steering unit 70 of the steering device 40 protrudes in the radial direction y.

Figure 5:
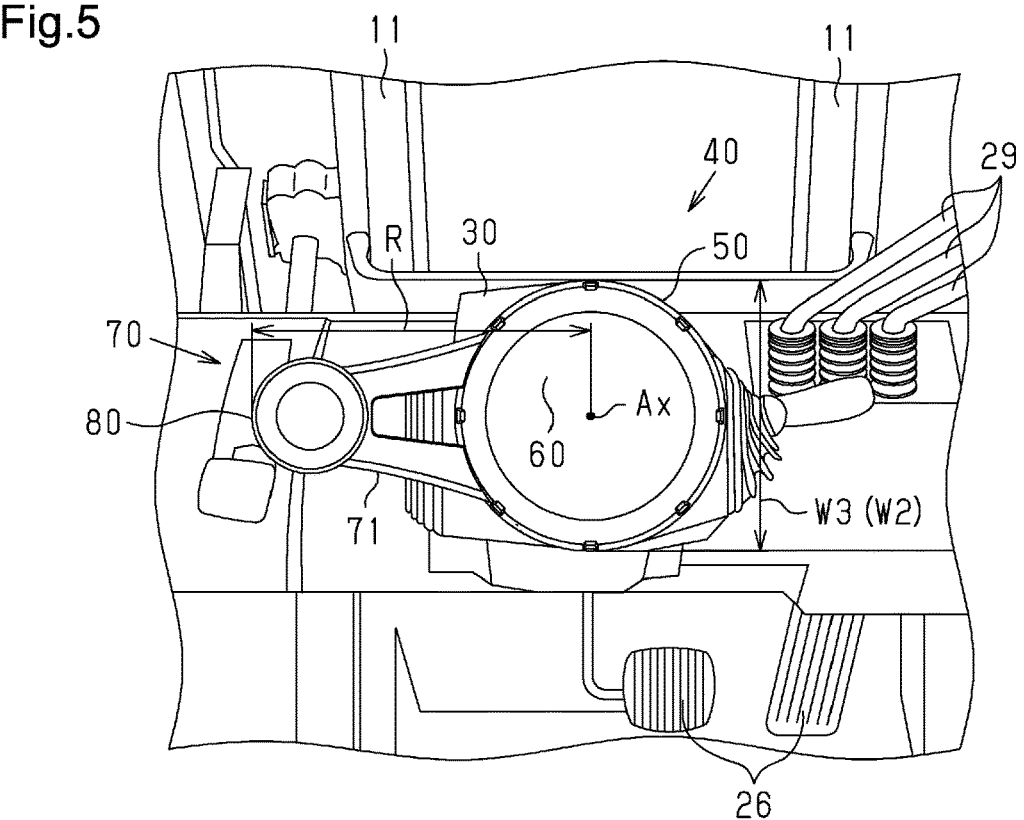
FIG. 5 is a plan view showing the steering device of FIG. 2 in the driver's cabin in the axial direction.

As shown in FIG. 5, the maximum width W3 of the entire steering device 40 is less than the protruding length R of the steering device 40. Thus, when, in particular, the steering device 40 is located at the neutral position, the steering device 40 does not overlap the front side of the driver's seat 25. This improves the operator's visibility of the front side. Further, the rotation central portion 50 is circular in plan view in the axial direction z. Thus, even if the steering device 40 is rotated, the shape of the rotation central portion 50 changes slightly. This improves the visibility of the steering device 40. Furthermore, the cargo handling operation unit 29 is located on the right side of the steering device 40 and located closer to the operator than the steering device 40. This allows the operator to operate the cargo handling operation unit 29 with the right hand while operating the steering device 40 with the left hand.

Figure 6:
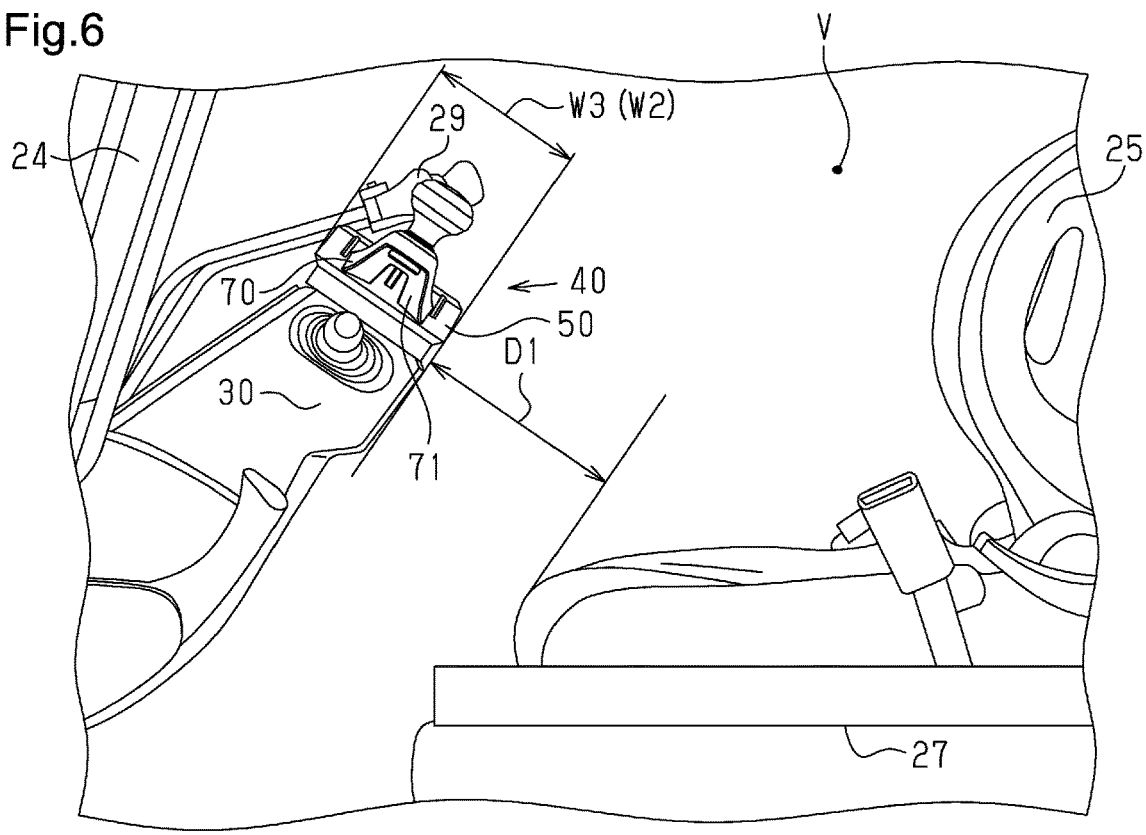
FIG. 6 is a plan view showing the steering device of FIG. 2 in the driver's seat from the left of the industrial vehicle.

As shown in FIG. 6, in the industrial vehicle 100, a distance D1 between the steering device 40 and the driver's seat 25 needs to be greater than a certain distance for the battery hood 27 to be opened. The distance D1 indicates how wide the driver's cabin V is. In the present embodiment, when the steering device 40 is located at the neutral position, the distance between the steering device 40 and the driver's seat 25 is the maximum. Thus, the distance D1 between the steering device 40 and the driver's seat 25 can be increased by adjusting the position of the steering unit 70.

Comparative Example

A case where the industrial vehicle 100 includes a ring-shaped steering device 200 instead of the steering device 40 of the present embodiment will now be described with reference to FIGS. 7 and 8. The components of the ring-shaped steering device 200 that correspond to those of the steering device 40 are given the same reference numbers, and will not be described. The protruding length of the ring-shaped steering device 200 and the protruding length R of the steering device 40 of the present embodiment are equal to each other and thus both referred to as the protruding length R to facilitate understanding.

The steering unit 70 of the ring-shaped steering device 200 includes the arm 71 and the grip 80. The arm 71 of the ring-shaped steering device 200 includes an annular rib 201. The rib 201 is located at the tip of a portion of the arm 71 that extends from the rotation central portion 50.

In plan view in the axial direction z, the center of the rib 201 overlaps the rotation axis Ax. In plan view in the axial direction z, the rotation central portion 50 is located in the rib 201. That is, the diameter of the rib 201 is greater than that of the rotation central portion 50. Thus, the rib 201 defines the outer edge of the ring-shaped steering device 200 in plan view in the axial direction z. Accordingly, if the thickness of the rib 201 is ignored, the width of the ring-shaped steering device 200 coincides with the diameter of the rib 201. Therefore, the width of the ring-shaped steering device 200 corresponds to the maximum width W1 of the steering unit 70.

The steering performance of the steering devices 40, 200 is determined by the torque of the rotation central portion 50 relative to a force applied to the grip 80 by the operator. The relationship between the force and the torque is determined by the distance from the rotation central portion 50 to the grip 80 in the radial direction y (determined by the radius of the rib 201 in the ring-shaped steering device 200 of the comparative example).

The distance D1 between the steering device 40, 200 and the driver's seat 25 is determined by the maximum width W3 of the entire steering device 40, 200. Thus, the space around the driver's seat 25 can be increased by reducing the maximum width W3 of the entire steering device 40, 200.

However, in the ring-shaped steering device 200, a decrease in the diameter of the rib 201 decreases the distance from the rotation central portion 50 to the rib 201 (grip 80), namely, the protruding length R of the ring-shaped steering device 200. Thus, a change in the diameter of the rib 201 (more specifically, a decrease in the diameter of the rib 201) adversely affects the steering performance of the industrial vehicle 100. This makes it difficult to reduce the size of the ring-shaped steering device 200 and improve the steering performance of the ring-shaped steering device 200.

Figure 7:
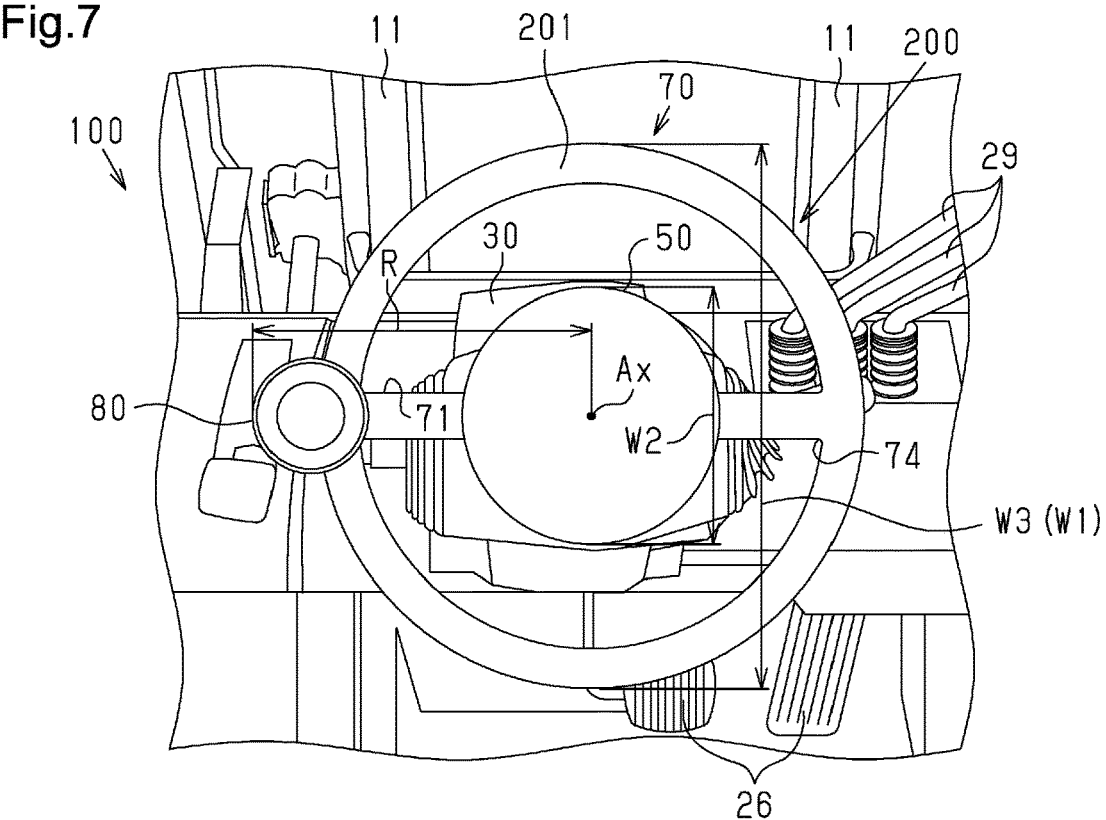
FIG. 7 is a plan view showing a ring-shaped steering device in the driver's cabin according to a comparative example in the axial direction.

Referring to FIG. 7, for example, the industrial vehicle 100 including the ring-shaped steering device 200 has a lower visibility of the front side from the driver's seat 25 than the industrial vehicle 100 including the steering device 40 of the present embodiment.

Figure 8:
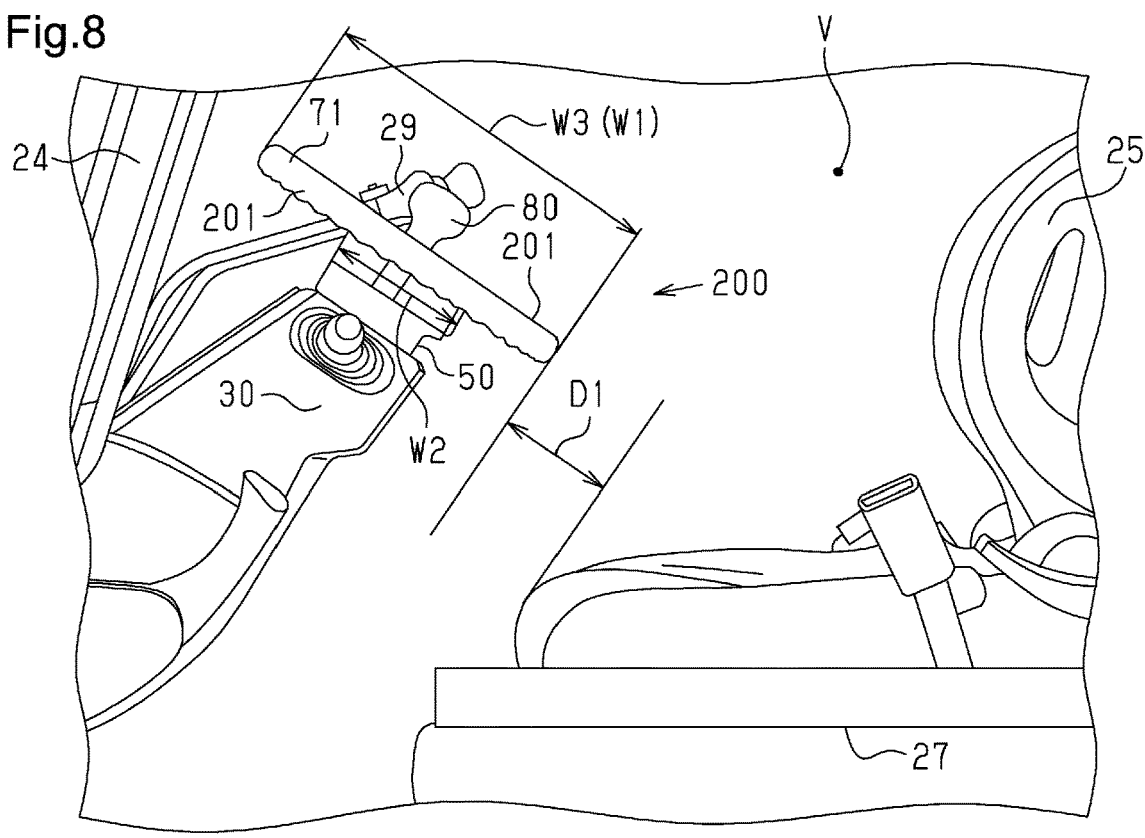
FIG. 8 is a plan view showing the ring-shaped steering device in the driver's cabin from the left of the industrial vehicle according to the comparative example.

Referring to FIG. 8, the industrial vehicle 100 including the ring-shaped steering device 200 has a shorter distance D1 between the ring-shaped steering device 200 and the driver's seat 25 than the industrial vehicle 100 including the steering device 40 of the present embodiment. Thus, the operator needs to widen the distance D1 between the ring-shaped steering device 200 and the driver's seat 25 by, for example, tilting the steering column 30 upward.

Operation

The operation of the present embodiment will now be described.

As shown in FIGS. 5 and 6, in plan view in the axial direction z, the steering device 40 of the present embodiment includes the arm 71 of the steering unit 70 protruding in the radial direction y. The grip 80 is disposed at an end of the arm 71. The maximum width W1 of the steering unit 70 is less than the maximum width W2 of the rotation central portion 50 (see FIG. 3). The maximum width W3 of the entire steering device 40 is the maximum width W2 of the rotation central portion 50.

As shown in FIGS. 7 and 8, the maximum width W3 of the entire ring-shaped steering device 200 in the comparative example is the maximum width W1 of the steering unit 70 (more specifically, rib 201), which is greater than the maximum width W2 of the rotation central portion 50. Thus, the maximum width W3 of the entire steering device 40 in the present embodiment is less than the maximum width W3 of the entire ring-shaped steering device 200 in the comparative example.

Advantages

The advantages of the present embodiment will now be described.

(1) The steering device 40 includes the rotation central portion 50 and the steering unit 70. The rotation central portion 50 includes the rotation axis Ax of the steering device 40. The steering unit 70 is connected to the rotation central portion 50. In plan view of the steering device 40 in the axial direction z, the steering unit 70 protrudes from the rotation central portion 50 in the radial direction y. The maximum width W1 of the steering unit 70 in the width direction x is less than or equal to the maximum width W2 of the rotation central portion 50 in the width direction x.

In this structure, the maximum width W1 of the steering unit 70 in the width direction x is less than or equal to the maximum width W2 of the rotation central portion 50 in the width direction x. Thus, as compared with the ring-shaped steering device 200 in which the steering unit 70 includes the annular rib 201, the maximum width W3 of the entire steering device 40 is reduced. Accordingly, as compared with the ring-shaped steering device 200, the steering device 40 is reduced in size.

(2) The steering unit 70 includes the arm 71 and the grip 80 in plan view of the steering device 40 in the axial direction z. The arm 71 extends from the rotation central portion 50 in the radial direction y. The grip 80 is connected to the merge side portion 74 (the tip of the arm 71) and extends at least in the axial direction z.

This structure allows the operator to apply torque to the rotation central portion 50 by applying, to the grip 80, a force in the width direction x. The grip 80 is connected to the tip (more specifically, merge side portion 74) of the arm 71 located opposite the rotation central portion 50. Thus, as compared with when the grip 80 is located in a middle portion of the arm 71, the operator generates torque with a smaller force. This improves the steering performance of the steering device 40.

(3) The rotation central portion 50 includes the display 60. In plan view of the steering device 40 in the axial direction z, the rotation axis Ax of the rotation central portion 50 overlaps part of the display 60.

This structure reduces the movement amount of the display 60 in a plane perpendicular to the axial direction z relative to the rotation of the steering device 40. Thus, a decrease in the visibility of the display 60 during operation of the steering device 40 is limited.

(4) The display 60 is circular in plan view of the steering device 40 in the axial direction z. In plan view of the steering device 40 in the axial direction z, the center of the display 60 overlaps the rotation axis Ax of the rotation central portion 50.

In this structure, in plan view of the steering device 40 in the axial direction z, the display 60 is concentric to the circle drawn by the rotation trajectory of the steering unit 70. Thus, the steering device 40 can be readily operated together with the display 60. This improves the visibility and steering performance of the steering device 40.

(5) The rotation central portion 50 includes the fixed portion 51 capable of being fixed to the industrial vehicle 100. The display 60 is fixed to the fixed portion 51.

In this structure, the display 60 is fixed to the fixed portion 51. Thus, even if the steering device 40 is rotated, the position of the display 60 remains unchanged. This improves the visibility of the display 60.

(6) The width of the arm 71 in the width direction x decreases from the rotation central portion 50 toward the grip 80.

In this structure, the width of the arm 71 increases from the grip 80 toward the rotation central portion 50. This connects the rotation central portion 50 to the arm 71 in a wider region and thus couples the rotation central portion 50 to the arm 71 more strongly. Accordingly, the durability of the steering device 40 is improved.

(7) The rotation central portion 50 includes the end wall 53. The end wall 53 is the connection end connected to the industrial vehicle 100. The distance between the arm 71 and the end wall 53 in the axial direction z increases from the rotation central portion 50 toward the grip 80.

In this structure, when the steering device 40 is connected to a vehicle (e.g., industrial vehicle 100), the grip 80 is located farther from the industrial vehicle 100 than the arm 71. Thus, the grip 80 is located closer to the operator than the arm 71. Accordingly, as compared with when, for example, the arm 71 is located closer to the operator than the grip 80, the arm 71 is less likely to contact the operator during steering of the steering device 40. This allows the operator to steer the steering device 40 more comfortably.

(8) The arm 71 includes the through portion 75 that extends through the arm 71 in the axial direction z.

In this structure, the through portion 75 of the arm 71 narrows a region that obstructs the line of sight in the axial direction z. This broadens the field of view in plan view in the axial direction z.

(9) The industrial vehicle 100 includes the above-described steering device 40.

In this structure, the industrial vehicle 100 is provided with a high visibility of the front side.

Particularly, in the industrial vehicle 100 (e.g., forklift), the forks 12 are loaded with cargo. Thus, the operator needs to see the cargo in front of the industrial vehicle 100. Accordingly, when the vehicle operated by the operator is the industrial vehicle 100, broadening the front field of view of the operator is particularly important. The steering device 40 has a smaller size than the ring-shaped steering device 200. Therefore, the steering device 40 is less likely to obstruct the operator's front field of view than the ring-shaped steering device 200 and thus broadens the operator's front field of view.

In some cases, the industrial vehicle 100 includes the battery hood 27 below the driver's seat 25 like the forklift of the present embodiment. The use of the ring-shaped steering device 200 requires time and effort to, for example, move the steering column 30 in order to increase the distance D1 between the ring-shaped steering device 200 and the driver's seat 25. When the industrial vehicle 100 includes the steering device 40 of the present embodiment, the distance D1 between the steering device 40 and the driver's seat 25 is increased so that the time and effort to open the battery hood 27 is saved.

Modifications

The present embodiment may be modified as follows. The present embodiment and the following modifications can be combined as long as the combined modifications remain technically consistent with each other.

The grip 80 does not have to be rotatable relative to the arm 71. For example, the grip 80 may be fixed to the arm 71. The grip 80 does not need to have a knob shape. For example, the grip 80 may be columnar or spherical.

The arm 71 may have any shape. The arm 71 is not limited to U-shaped and may be, for example, V-shaped or O-shaped. The arm 71 may extend horizontally from the rotation portion 52 in the radial direction y. Alternatively, the width of the arm 71 may be fixed or may increase as the arm 71 becomes farther from the rotation central portion 50 in the radial direction y. In short, as long as the maximum width W1 of the steering unit 70 is less than or equal to the maximum width W2 of the rotation central portion 50, the steering unit 70 may have any shape.

The number of through portions 75 is not limited to one and may be two or more. Alternatively, the through portion 75 does not have to be disposed. The through portion 75 may have any shape (e.g., circular hole or quadrilateral hole). The through portion 75 may extend through the arm 71 and the grip 80 in the axial direction z.

In plan view in the axial direction z, the display 60 does not have to be circular. For example, in plan view in the axial direction z, the display 60 may have a polygonal shape or may have a combination of geometrical shapes.

The number of displays 60 is not limited to one and may be two or more. The display 60 does not have to display information related to the industrial vehicle 100 and may display any content.

The display 60 does not have to be fixed to the fixed portion 51. For example, the display 60 may be fixed to the rotation portion 52. In this structure, the display 60 is rotatable integrally with the rotation portion 52. Thus, the display 60 is rotatable integrally with the steering unit 70. In this structure, the display 60 rotates together with the steering unit 70. This allows the operator to easily see the rotation angle of the steering device 40 from the appearance of the display 60. Thus, the operator easily operates the steering device 40.

In this modification, the control circuit 28 may prevent the display content of the display 60 from rotating as the display 60 rotates.

Figure 9:
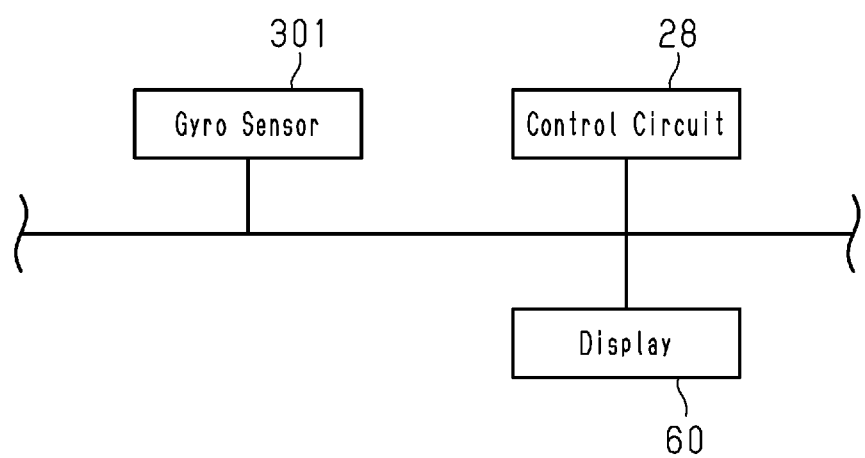
FIG. 9 is a diagram illustrating the system configuration of the industrial vehicle according to a modification.

As shown in FIG. 9, the industrial vehicle 100 includes, for example, a gyro sensor 301. The gyro sensor 301 measures the angular velocity of the steering device 40.

The control circuit 28 obtains the angular velocity of the steering device 40 from the gyro sensor 301. Based on the obtained result, the control circuit 28 obtains the rotation angle of the steering device 40. The rotation angle of the steering device 40 indicates the displacement of the steering device 40 from the neutral position.

Then, based on the obtained result, the control circuit 28 obtains a rotation state of the display 60 (i.e., a rotation state of the steering device 40). Examples of the rotation state include the rotation angle and angular velocity of the display 60.

Subsequently, based on the obtained rotation state, the control circuit 28 rotates the display content of the display 60 so as to cancel the rotation of the display 60. For example, the control circuit 28 rotates the display content by the rotation angle of the display 60 in a direction opposite the rotation direction of the display 60.

In such a configuration, even if the display 60 rotates integrally with the steering unit 70, rotation of the display content from the operator's point of view is prevented. This allows the operator to easily check the display content.

The rotation central portion 50 may have any shape. For example, the rotation central portion 50 may have a tubular shape without the protruding circumferential wall 56 or may have a quadrilateral tubular shape.

The rotation central portion 50 does not have to include the fixed portion 51. In other words, the entire steering device 40 may be rotatable with respect to the rotation axis Ax.

The industrial vehicle 100 does not have to be driven by electric power. For example, the industrial vehicle 100 may be driven by an internal combustion engine or may be driven by hydrogen and oxygen. The industrial vehicle 100 is not limited to a forklift and may be, for example, a towing tractor or a tractor.

The vehicle in which the steering device 40 is disposed is not limited to an industrial vehicle and may be, for example, a passenger car.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A steering device used to steer a vehicle, the steering device comprising:
    a rotation central portion that includes a rotation axis of the steering device; and
    a steering unit that is connected to the rotation central portion, wherein
    a direction in which the rotation axis of the rotation central portion extends is referred to as an axial direction,
    one of directions that are perpendicular to the axial direction is referred to as a radial direction,
    a direction that is perpendicular to the axial direction and the radial direction is referred to as a width direction,
    the steering unit protrudes from the rotation central portion in the radial direction in a plan view of the steering device in the axial direction,
    the steering unit includes an arm and a grip in the plan view of the steering device in the axial direction, the arm extending from the rotation central portion in the radial direction, and the grip being connected to a tip of the arm and extending at least in the axial direction,
    a width of the arm in the width direction decreases as a distance from an end of the arm connected to the rotation central portion toward the tip of the arm increases, and
    a maximum width of the steering unit in the width direction is less than or equal to a maximum width of the rotation central portion in the width direction.

2. The steering device according to claim 1, wherein the tip is an end of the arm located opposite the rotation central portion.

3. The steering device according to claim 2, wherein the rotation central portion includes a connection end that is connected to the vehicle, and
    a distance between the arm and the connection end in the axial direction increases from the rotation central portion toward the grip.

4. The steering device according to claim 2, wherein the arm includes a through portion that extends through the arm in the axial direction.

5. The steering device according to claim 2, wherein the rotation central portion includes a display, and
    the rotation axis overlaps part of the display in the plan view of the steering device in the axial direction.

6. The steering device according to claim 5, wherein the display is circular in the plan view of the steering device in the axial direction, and
    a center of the display overlaps the rotation axis in the plan view of the steering device in the axial direction.

7. The steering device according to claim 5, wherein the rotation central portion includes a fixed portion capable of being fixed to the vehicle, and
    the display is fixed to the fixed portion.

8. The steering device according to claim 5, wherein the display is rotatable integrally with the steering unit.

9. An industrial vehicle, comprising the steering device according to claim 1.

* * * * *